Oct. 6, 1964   L. M. CHATHAM ETAL   3,151,705
SLACK ADJUSTING MEANS FOR A BRAKE MECHANISM
Filed April 20, 1961                                   5 Sheets-Sheet 3

INVENTORS
Russell E. Chatham, &
Luther M. Chatham.
BY
Victor J. Evans & Co.
Attorneys

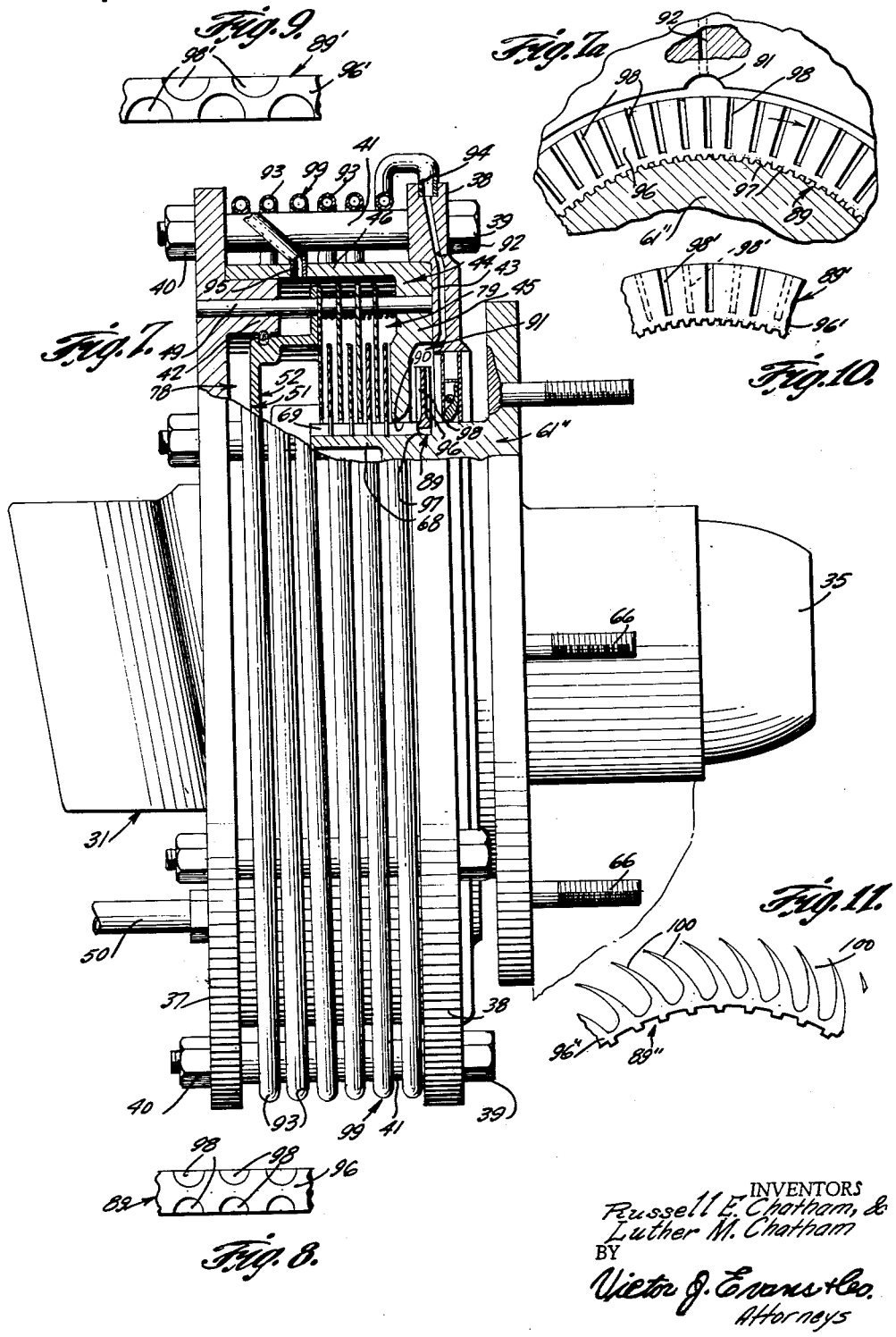

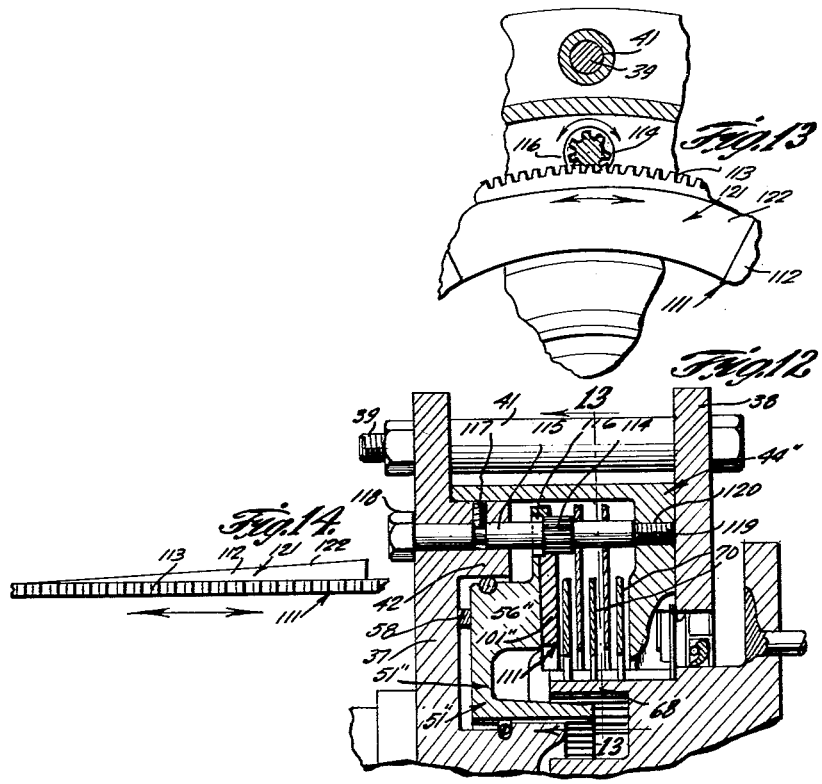

United States Patent Office 3,151,705
Patented Oct. 6, 1964

3,151,705
SLACK ADJUSTING MEANS FOR A BRAKE
MECHANISM
Luther M. Chatham, 180 Luckie St. NW., Atlanta 3, Ga.,
and Russell E. Chatham, 264 Conville Drive NE.,
Atlanta 19, Ga.
Filed Apr. 20, 1961, Ser. No. 104,348
1 Claim. (Cl. 188—72)

The present invention relates to a brake mechanism, and more particularly to a brake mechanism for a vehicle such as an automobile, truck or the like, although it is to be understood that the brake mechanism of the present invention can be utilized in any particular type of apparatus or structure that utilizes a braking action to slow down or stop rotation of a rotary member.

The primary object of this invention is to provide a brake mechanism which when used in a vehicle, is adapted to be connected to and actuated by the usual master cylinder of the vehicle hydraulic brake system so that upon application of foot pressure to the usual foot pedal in the vehicle, the brakes will be effectively applied in order to stop or slow down motion of the vehicle, and wherein according to the present invention the brake mechanism embodies interfitting and co-acting rings and discs which will move together when the foot pedal is applied to bring about the desired braking action.

A further object is to provide a brake mechanism which is adapted to operate in an extremely quiet manner since the brakes are constructed so that noise, heat and squeals will be eliminated, and wherein over heating of the brakes will be minimized or prevented so as to help insure that the brakes will not readily get hot and fade out and thus cause poor brakes.

A still further object of the invention is to provide a multiple disc fluid control brake mechanism that can be readily installed and serviced and wherein the disc type brake mechanism of the present invention is especially suitable for use on vehicles such as automobiles, trucks, buses or the like, and wherein the parts are adapted to be arranged in a compact neat unit so that they can be readily attached to such vehicles, and wherein excessive heat and wear that is ordinarily destructive of brake operation will be eliminated or minimized, and wherein in certain forms or modifications of the invention a fluid used in the brakes can be circulated and cooled, and wherein the brake mechanism is also adapted to be utilized as a novel means for adjusting the same.

Another object is to provide an apparatus of the character described that is rugged in structure and foolproof in operation and which is efficient in use and which is economical to manufacture.

Further objects and advantages of the invention are to provide improved elements and arrangements thereof in a device of the character described that is durable in form, easy and economical to produce, and conducive to the most advantageous and economical use of materials and uniformity of members formed therefrom.

Still further objects and advantages will become apparent in the subsequent description in the specification.

In the drawings:

FIGURE 6 is a fragmentary elevational view showing a portion of one of the rings.

FIGURE 7 is an elevational view, with parts broken away and in section illustrating a modification.

FIGURE 7a is a view on an enlarged scale illustrating certain constructional details of the device of FIGURE 7.

FIGURE 8 is a fragmentary plan view illustrating a portion of the pump of FIGURE 7 and 7a.

FIGURE 9 is a fragmentary plan view of a modification generally similarly to FIGURE 8 but showing a slightly different type of pump.

FIGURE 10 is an elevational view showing the pump of FIGURE 9, and with parts broken away.

FIGURE 11 is a fragmentary elevational view of a further modified pump.

FIGURE 12 is a fragmentary sectional view of a further modified brake mechanism.

FIGURE 13 is a sectional view taken on the lines 13—13 of FIGURE 12.

FIGURE 14 is a fragmentary elevational view showing a part of the adjusting member for the device of FIGURES 12 and 13.

Figure 1:
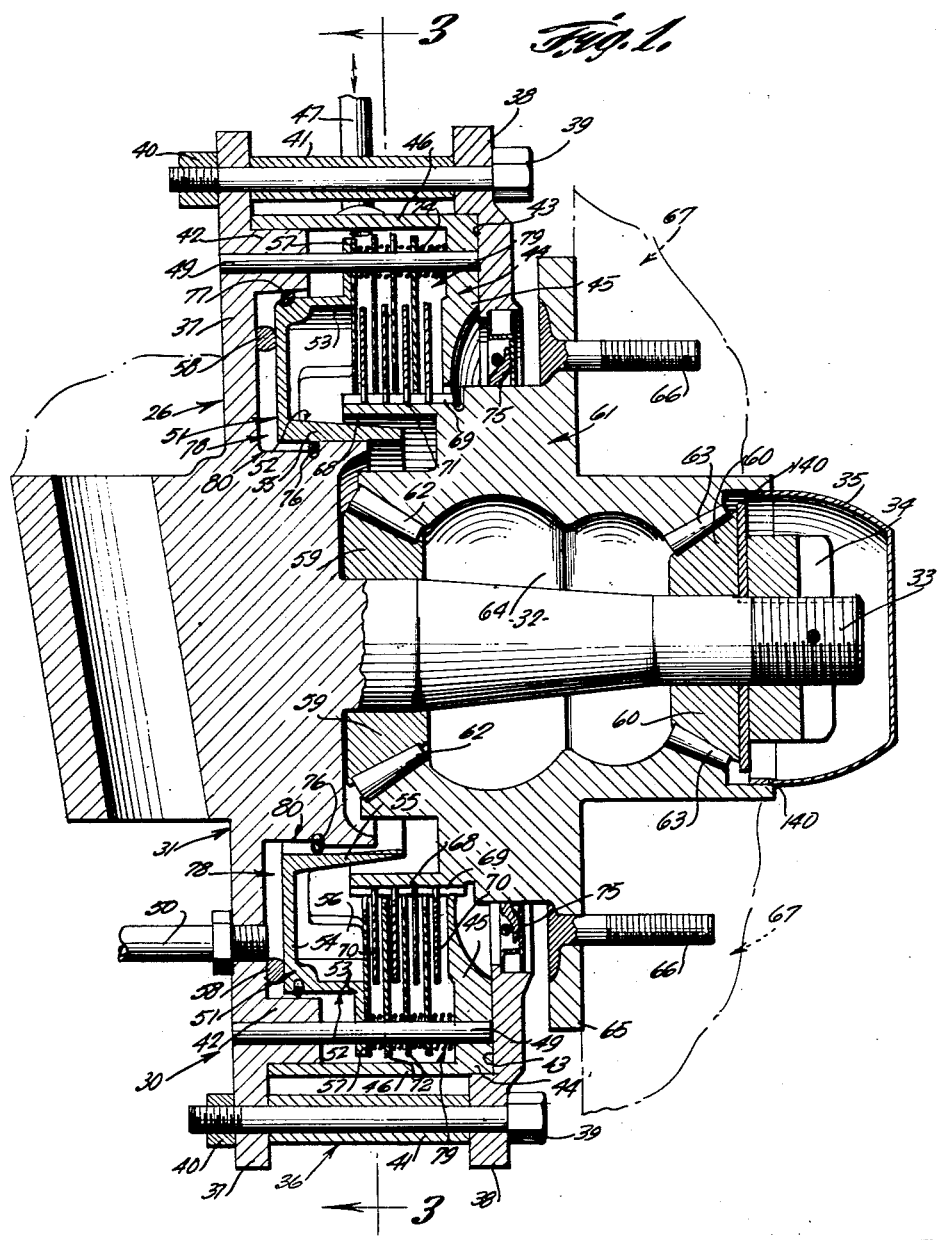
FIGURE 1 is a sectional view taken through a brake mechanism constructed according to the present invention, and illustrating the brake mechanism on a front wheel of a vehicle.

Referring in detail to the drawings, and more particular to FIGURES 1, 3, 5 and 6 of the drawings, the numeral 30 indicates a front wheel assembly for a vehicle and wherein it will be seen that there is provided a non-rotary spindle that is indicated generally by the numeral 31, and the spindle 31 includes a shaft portion 32 of reduced diameter which is provided with an outer threaded end 33, and the numeral 34 indicates a fastener or nut that is arranged in threaded engagement with the threaded end 33. A hub cap 35 is arranged over the fastener 34. The numeral 36 indicates a brake drum assembly which comprises an inner generally circular wall 37 that is secured to or formed integral with the spindle 31, and the brake drum assembly 36 further includes an outer circular wall 38 which is spaced from the inner wall 37, and as shown in FIGURE 1 a plurality of spaced apart securing elements or bolts 39 connect the walls 38 and 37 together, and these bolts 39 have nuts or fasteners 40 arranged in threaded engagement with the end portions thereof. Cylindrical bushings or spacers 41 are circumposed on the bolts 39, and these spacers 41 are interposed between the inner and outer walls 37 and 38.

There is further provided an annular shoulder 42 that is integral with the wall 37, and the wall 38 is provided with a generally circular recess or cutout 43. The numeral 44 indicates a body member that comprises a circular wall section 45 that is snugly seated in the recess 43 of the wall 38, and the body member 44 further includes a cylindrical wall portion 46 that surrounds the shoulder 42 of the wall 37. A line or conduit 47 is suitably connected to the wall portion 46, and the conduit 47 is adapted to be connected to a suitable conventional servo mechanism or pressure regulator for a purpose to be later described.

As shown in FIGURE 1, there is provided a plurality of spaced parallel pins 49 which extend through the wall section 45 of the body member 44, and the pins 49 also extend through the shoulder 42 and wall 37. The numeral 50 indicates a conduit or line which is adapted to be connected to the usual master cylinder of the vehicle whereby hydraulic fluid under pressure can flow through the conduit 50. The brake mechanism of the present invention further includes a movable piston which is indicated generally by the numeral 51, and the piston 51 is of generally annular formation and includes a base portion 52 which is defined by sections 53, 54 and 55 that are arranged angularly with respect to each other, and a plurality of spaced apart lugs 56 are secured to or formed integral with the base portion 52. The numeral 57 indicates a circular flange that is integral with the base portion 52, and spacer pieces 58 are adapted to be interposed between the section 54 of the piston 51 on the wall 37. The pins 49 extend through suitable openings in the flange 57 of the piston 51.

Conical elements 59 and 60 are mounted on the shaft portion 32 of the spindle 31, and the numeral 61 indicates a rotary hub that surrounds the shaft portion 32, and bearings 62 and 63 are interposed between the hub 61 and the elements 59 and 60 so as to insure that the hub 61 can rotate with a minimum amount of friction. The numeral 64 indicates an inner chamber or space provided within the hub 61. Secured to or formed integral with the hub 61 and extending outwardly therefrom is a circular flange 65, and a plurality of spaced apart studs or bolts 66 are suitably connected to the flange member 65, and these studs 66 are adapted to be used for connecting a wheel such as the front wheel 67 to the hub 61, and the wheel 67 is of conventional construction. The numeral 68 indicates a cylindrical sleeve that is integral with the hub 61, and there is provided in the outer surface of the sleeve 68 a plurality of spaced apart key ways or slots 69.

Circular discs 70 surround the sleeve 68, and a plurality of the discs 70 are arranged in spaced parallel relation with respect to each other as for example when the parts are in the position of FIGURE 1, and these discs 70 are each provided with inwardly projecting tongues or projections 71 that snugly engage the keyway slots 69 whereby the discs 70 and hub 61 rotate in unison.

There is further provided a plurality of spaced parallel circular rings 72, FIGURE 6, and each of the rings 72 is provided with spaced apart openings 73 therein for the projection therethrough of the pins 49, and the rings 72 have a diameter that is greater than the diameter of the discs 70. Coil springs 74 are circumposed on the pins 49, and the coil springs 74 are interposed between the rings 72 for normally urging the rings apart or away from each other.

The numeral 75 indicates a pressure seal, while the numerals 76 and 77 indicate O rings for providing a fluid tight arrangement. The numeral 78 indicates a space or chamber that is adapted to receive the hydraulic fluid from the conduit 50 that is connected to the vehicle master cylinder, and the numeral 79 indicates a chamber or space in which is positioned the rings and discs, and the chamber 79 has the conduit 47 arranged in communication therewith.

In FIGURE 1 the numeral 80 indicates a generally cylindrical support portion that is formed integral with or secured to the spindle 31.

Figure 2:
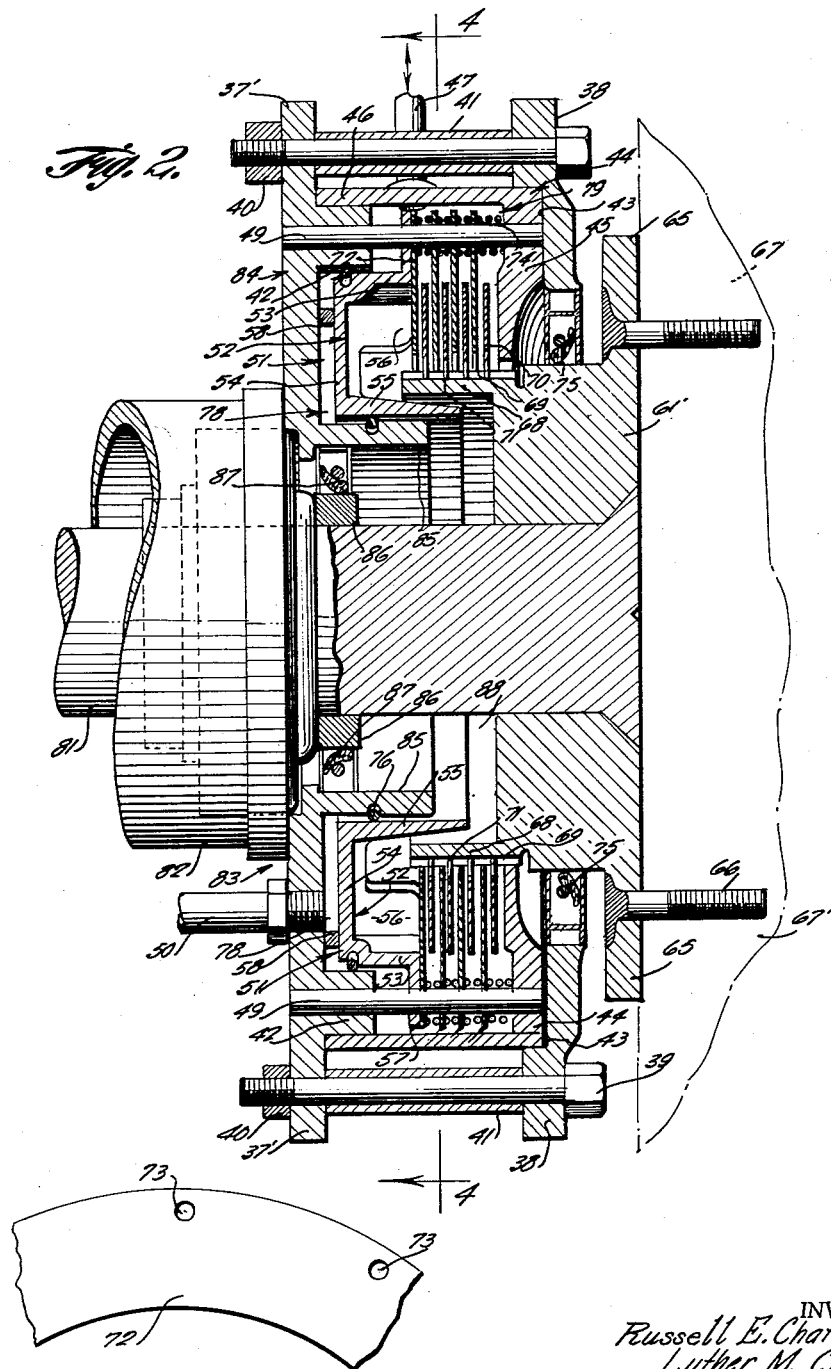
FIGURE 2 is a view generally similar to FIGURE 1 but showing the use of the brake mechanism in conjunction with a rear wheel of a vehicle.

Referring now to FIGURES 2, 4, 5 and 6 of the drawings there is illustrated a rear wheel assembly 83 for a vehicle, and in FIGURE 2 the numeral 81 indicates a rotary rear axle that extends through the usual non-rotary housing 82, and as shown in this figure the numeral 84 indicates the rear brake drum assembly which is shown to comprise an inner wall 37' that has a construction and function generally the same as the previously described wall 37. The brake drum assembly 84 further includes an outer wall 38, and as shown in the drawings a cylindrical support portion 85 is formed integral with the wall 37'. A ring member 86 surrounds the axle 81, and a pressure seal 87 is mounted on the ring member 86 in order to close off the chamber or area 88. In FIGURE 2 the numeral 61' indicates the rotary hub that is suitably secured to the rotary axle 81. The wall 37' does not rotate, but the hub 61' rotates, and since the studs 66 connect the hub 61' to the rear wheel 67', it will be seen that this rotation of the hub and rear axle will cause the rear wheel to turn on in order to drive the vehicle in the usual manner.

In connection with the rear wheel assembly 83 shown in FIGURE 2, it is to be noted that when foot pressure is applied to the usual brake pedal in the vehicle, the conventional master cylinder of the vehicle will cause pressure on the hydraulic fluid to be transmitted to the conduit 50 and into the area or chamber 78 so as to move the piston 51 away from the wall 37', whereby the lugs 56 of the piston 51 will urge or bias the rings 72 and discs 70 together so that a braking action will take place and this braking action will cause the hub 61' which has the rear wheel 67' thereon to slow down or stop whereby motion or movement of the vehicle will be readily controlled. The conduit 47 connects the chamber 79 to a suitable pressure regulating servo type of mechanism so that such a servo mechanism can be used for automatically regulating or controlling the pressure of the oil or fluid in the chamber 79 as the rings and discs move towards or away from each other.

Referring now to FIGURES 7, 7a, and FIGURE 8 of the drawings, there is illustrated a modified vehicle brake mechanism which includes a means for cooling the fluid within the brake mechanism. As shown in these figures the numeral 61″ indicates a hub that is rotatably supported, and the hub 61″ has a centrifugal pump 89 connected thereto so that as the hub 61″ rotates, the pump 89 will rotate therewith. The pump 89 is shown to have a construction whereby fluid can be received from the space 90 and then the fluid can be pumped outwardly by centrifugal force into a flaring mouth or wide aperture 91 whereby this fluid will then flow through a passageway 92 in the outer wall 38. The numeral 99 indicates a coiled line or tubular conduit which has one end portion 94 communicating with the outer end of the passageway 92, and the cooling line 99 further includes a coiled section 93 that surrounds the plurality of spacers 41 on the securing elements 39 so that as the fluid is pumped through or circulates through the coiled portion 93, the fluid will be cooled before it is returned to the interior of the brake mechanism through the port or opening 95. As shown in the drawings, the centrifugal pump 89 consists of a circular plate 96 that is provided with a plurality of inwardly directed projections or protrusions 97 for engaging the slots such as the slots 69 in the sleeve portion 68 of the hub 61″, whereby as the hub 61″ rotates, the centrifugal pump 89 will rotate therewith. The plate 96 is further provided with a plurality of spaced apart recesses 98 that define pockets for helping to pump the fluid into the passageway 92, and as shown in FIGURE 8 these recesses 98 are arranged in spaced apart separate rows, and wherein these recesses 98 are in opposed relation with respect to each other. In FIGURES 9 and 10 there is illustrated a modified centrifugal pump 89' which is adapted to be used in lieu of or instead of the pump 89, and the modified pump 89' includes a circular plate 96' that has a plurality of recesses 98' therein, and the recesses 98' are arranged in staggered relation as shown in FIGURES 9 and 10, instead of being arranged in rows that are such that the recesses are opposite to each as in FIGURE 8. Otherwise, the construction and functions of the pump 89' are the same as that described in connection with the pump 89. In FIGURE 11 there is illustrated a further modification of the centrifugal pump which is indicated generally by the numeral 89″, and it will be seen that in FIGURE 11 the modified pump 89″ includes a circular plate 96″ that has a plurality of curved vanes or blades 100 which serve to exert the pumping action on the fluid whereby the fluid will enter the passageway 92 as the hub rotates the pump 89″.

Attention is now directed to FIGURES 12, 13 and 14 of the drawings, wherein there is illustrated a further modified vehicle brake mechanism which is shown to comprise a movable piston 51″ that has lugs 56″ secured thereto or formed integral therewith, and these lugs 56″ are provided with flat surfaces or faces 101″. The numeral 111 indicates an adjustment device which comprises a circular ring like plate 112 that has a plurality of teeth 113 on its outer periphery so as to provide a rack, and the teeth 113 of the rack are in meshing engagement with a pinion gear 114 that is secured to a rotary shaft or rod 115. The rod 115 extends through an opening 116 in the flange of the piston 51″, and the rod 115 is retained in place by means of a retainer or key 117. The rod or bolt 115 includes an enlarged head 118 which can be readily engaged so that the rod 115 can be turned in order to rotate the pinion gear 114 whereby the plate 112 can be rotated as desired. The rod 115 includes a reduced diameter end portion 119 that is journaled in an opening 120 of the body member 44″. Secured to or formed integral with the plate 112 is a plurality of spaced apart cams 121 which each have a tapered or inclined surface 122 for coaction with the flat surfaces 101″ of the lugs 56″, as later described in this application.

From the foregoing, it is apparent that there has been provided a brake mechanism which is especially suitable for use on a vehicle such as an automobile, truck, bus or the like, and in use with the parts arranged as shown in the drawings and in particular as shown in FIGURES 1, 3, 5 and 6 of the drawings, it will be seen that there has been provided a front wheel assembly 30, and it is to be understood that a vehicle such as an automobile is adapted to be equipped or provided with two of the front wheel assemblies 30 as well as two of the rear wheel assemblies 83 such as that shown in FIGURE 2. When the vehicle is being driven, the rings 72 and discs 70 are out of contact with each other so that with reference to the front wheel assembly 30 shown in FIGURE 1 for example, it will be seen that the spindle 31 is adapted to be attached to the front portion of the vehicle chassis or frame in the usual manner, and the hub 61 is free to rotate on the shaft portion 32 of the spindle due to the provision of the parts including the bearings 62 and 63. The hub cap 35 is snugly engaged in a recess such as the recess 140 in the end of the rotary hub 61, and the hub 61 turns or rotates while the spindle 31 does not rotate. The front wheel as indicated partially by dotted lines and indicated by the numeral 67 in FIGURE 1 is adapted to be attached to the flange 65 of the hub 61 by means of the usual stud 66 so that the front wheel and hub 61 will rotate in unison. The pressure seal 75 serves to insure that there will be no leakage of fluid between the non-rotating wall 33 and the rotating hub 61. The hub 61 includes the cylindrical sleeve portion 68 which is provided with the plurality of spaced apart slots 69 therein, and the plurality of spaced parallel discs 70 are mounted on the sleeve 68, and these discs 70 have their projections or tongues 71 snugly engaged in the slots 69 so that as the hub 61 rotates, these discs 70 will rotate therewith. It is to be noted that the rings 72 are of a diameter that is greater than the diameter of the discs 70, and with the parts assembled as shown in the drawings it will be seen that one of the rings 72 is interposed or positioned between each adjacent pair of discs 70, and these rings 72 have openings 73 therein whereby the pins 49 can extend through these rings. The rings 72 do not rotate, but the discs 70 rotate. This is because the rings 72 are connected or held in place by means of the pins 49, and the pins 49 extend through and between the wall 37 and the wall section 45 of the body member 44. The body member 44 likewise does not rotate, and the wall 38 does not rotate since the wall 38 is connected to the non-rotating wall 37 by means of the bolts 39. The wall 38 is recessed as at 43 so as to snugly receive therein a portion of the body member 44, and it is to be noted that there is provided the plurality of coil springs or spring members 74 which are circumposed on the pins 49, and these springs 74 are interposed between the adjacent pairs of rings 72 so as to normally urge or bias the rings apart.

The front wheel assembly 30 further includes the moveable piston 51 which embodies the base portion 52, and the piston 51 has a generally annular or circular formation and carried by the piston 51 is the plurality of spaced apart lugs 56 which are adapted to abut or bear against the adjacent rings 72. The flange 57 of the piston is provided with openings through which extend the pins 49.

With this construction, it will be seen that when the foot pedal of the vehicle is actuated, that is when foot pressure is applied to the foot pedal, the usual vehicle master cylinder will be energized so that with the conduit 50 connected to the vehicle master cylinder, it will be seen that hydraulic fluid under pressure will be transmitted through the conduit 50 and into the space or chamber 78 so as to move or urge the piston 51 away from the wall 37, that is the piston 51 will be moved from left to right in FIGURE 1 as the foot pedal is depressed. As the piston 51 moves from left to right in FIGURE 1, its lugs 56 will move into engagement with the rings 72 arranged contiguous thereto and as the piston 51 continues to move from left to right in FIGURE 1, it will compress the group or set of rings 72 and discs 70 so that these rings and discs will be brought into frictional engagement with each other in order to slow down the movement of the hub 61 and thus slow down or stop the vehicle to which it is applied. As these rings and discs are compressed or squeezed together by action of the piston 51, fluid pressure from the chamber 79 can be transmitted outwardly through the conduit 47 to a suitable pressure regulator so as to permit the necessary compression or movement of the rings and discs to take place, whereby the proper pressure will be retained or maintained in the chamber 79. It is to be noted that the chamber or space 78 is entirely separate from the chamber 79 and the chamber 78 receives hydraulic fluid from the conduit 50, but the chamber 79 has a separate quantity of fluid therein which never enters the usual hydraulic brake lines or other parts of the vehicle brake system.

When foot pressure is released on the vehicle brake pedal, the inherent resiliency of the coiled springs 74 will spread the discs and rings apart to their normal position so that the hub and wheel can freely rotate with respect to the non-rotating spindle 31. As the expansion of the springs 74 occurs or takes place, fluid can return to the chamber 79 from the pressure regulator through the conduit 47, and in addition the piston 51 will be returned to its normal position, that is the piston 51 will move from right to left in FIGURE 1 and when this takes place the necessary amount of hydraulic fluid can be discharged outwardly from the chamber 78 through the conduit 50 to a reservoir, master cylinder or the like. The stop members 58 serve to limit return movement of the piston 51 so as to insure that the piston 51 will not move all the way against the fittings or inlet ports for the conduit 50 in order to make sure that there will always be initially some small area or space whereby the hydraulic fluid from the conduit 50 can enter and start to move the piston 51 when the brakes are being applied.

The O rings such as the O rings 76 and 77 insure that there will be a fluid tight joint or seal around the sliding piston 51 so that there will be no intermingling or intermixing of fluids between the chambers 78 and 79.

Figure 3:
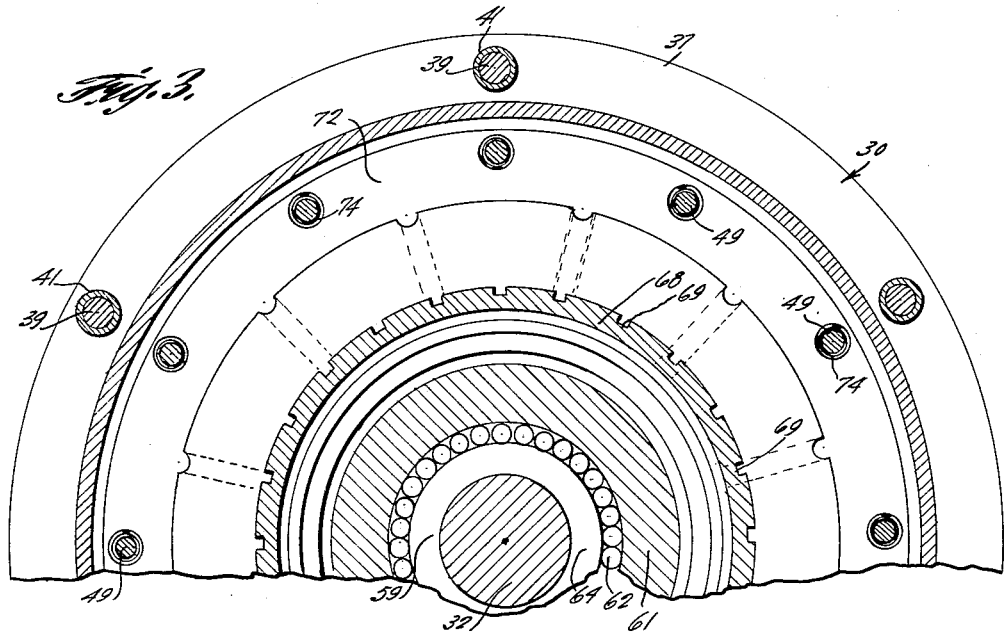
FIGURE 3 is a sectional view taken on the line 3—3 of FIGURE 1.
Figure 4:
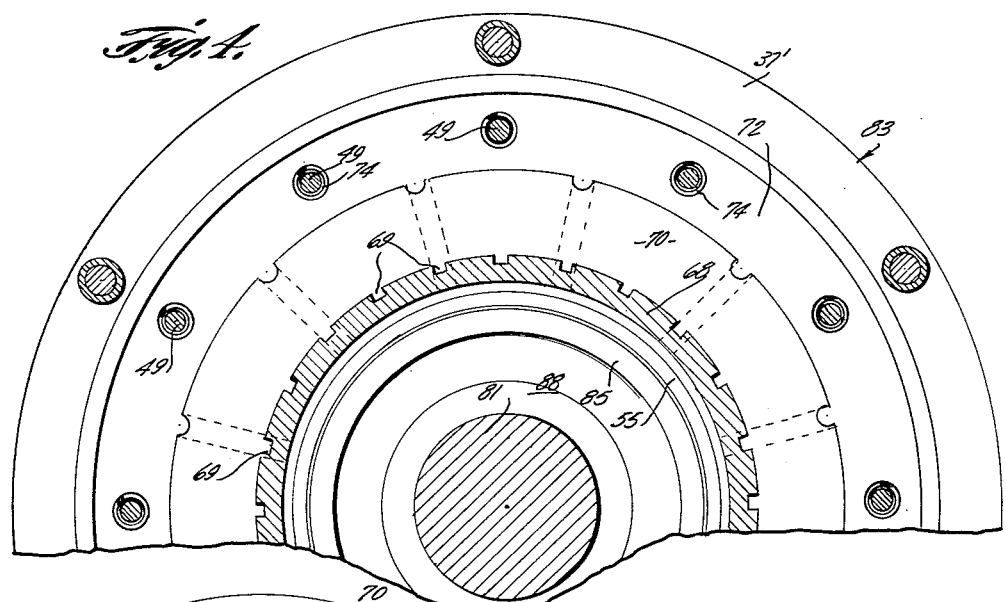
FIGURE 4 is a sectional view taken on the line 4—4 of FIGURE 2.
Figure 5:
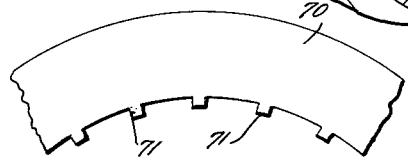
FIGURE 5 is a fragmentary elevational view illustrating one of the discs.

The rear wheel assembly 83 shown in FIGURES 2 and 3 has a construction and operation that is somewhat similar to the construction and functioning of the front wheel assembly 30. That is with the parts arranged as shown in FIGURE 2, the axle 81 is adapted to be rotated in the usual manner, and this rotation of the axle 81 in the housing 82 causes rotation of the hub 61′ since the hub 61′ is securely affixed to the axle 81, and with the rear wheel 67′ connected to the hub 61′ by means of the stubs 66, it will be seen that this rotation of the axle 81 and hub 61′ will cause corresponding rotation of the rear wheel 67′ whereby the vehicle can be driven in the usual manner so that these discs 70 will rotate in unison with the hub 61′. The housing or casing 82 does not rotate, and likewise the walls 37′ and 38, and the body member 44 do not rotate. The rings 72 likewise do not rotate, but the rings 72 and discs 70 are mounted for movement towards and away from each other so that with the parts arranged as shown in FIGURE 2, it will be seen that when foot pressure is applied to the usual brake pedal of the vehicle hydraulic fluid from the master cylinder will be transmitted through the conduit 50 into the area or chamber 78 so as to move the piston 51 from left to right in order to cause the lugs 56 of the piston 51 to compress the group of interfitting and coacting discs and rings whereby the hub 61' and axle 81 will be slowed down or stopped so that movement of the rear wheel 67' can be controlled. When pressure on the foot pedal is released, the coil springs 74 return the parts to their normal position as previously described in connection with the wheel assembly 30 of FIGURE 1, so that there will be no interference with normal rotation of the rear wheels.

In the modification of FIGURES 7, 7a and 8, the operation and construction is generally the same as that described in connection with a figure such as FIGURE 1 for example, and it will be seen that the hub 61" functions in generally the same manner as the previously described hub 61. The centrifugal pump 89 consists of the ring 96 that is keyed to the hub 61" so that as the hub 61" rotates, the centrifugal pump ring 96 will likewise rotate, and due to the provision of the pockets or recesses 98, some of the fluid from the chamber 79 will be circulated or pumped through the space or area 90 and this fluid will be pumped outwardly by centrifugal force so that the fluid will enter the passageway or channel 92 through the flaring opening 91, and from the passageway 92 this fluid will enter the coiled portion 93 of the line 99 whereby this fluid will be cooled as it flows through the air cooled conduit or line 99, and after flowing through the line 99 the fluid will return to the chamber 79 through the return port or opening 95. Thus, this construction provides a means for insuring that the fluid in the chamber 79 is effectively and efficiently cooled so as to prevent overheating of the brake mechanism during operation of the vehicle.

The centrifugal pump may have different forms or construction as desired, and for example as shown in FIGURES 7, 7a and 8, the pump ring 96 may have two rows of recesses 98 that are arranged opposite each other, or else as shown in FIGURES 9 and 10 the centrifugal pump ring 96' may have two rows of recesses or pockets 98' that are arranged in staggered relation with respect to each other, or as shown in FIGURE 11 the centrifugal pump 89" may consist of a ring member 96" which has curved vanes or blades 100 for causing the fluid to be pumped outwardly by centrifugal force as the hub rotates.

In the modification of FIGURES 12, 13 and 14, it is only necessary to turn the rod 115 as for example by placing a wrench in engagement with the head 118 of the rod or bolt 115, and then by rotating the rod 115, the pinion gear 114 will be rotated and since the pinion gear 114 is in mesh with the teeth 113 of the adjustment ring 112, it will be seen that this rotation of the rod 115 will cause corresponding rotation or movement of the adjustment ring 112. In view of the fact that the adjustment ring 112 has the plurality of cams 121 thereon, and since these cams 121 each have the tapered or beveled surface 122, it will be seen that this movement of the adjustment ring 112 will cause corresponding movement or shifting of the cams 121 so that the tapered surfaces 122 can be moved to a desired position such that the surfaces 101" of the lugs 56" will cause the braking action to take place at the desired or proper time.

The parts can be made of any suitable material, and in different shapes or sizes as desired or required.

While the present invention has been described specifically for use with wheels of vehicles, it is to be understood that the braking mechanism described and illustrated herein can be used in other applications besides vehicle wheels. Also, a wheel assembly may be constructed so that it includes several of the modifications therein, that is a wheel assembly of FIGURES 1 or 2 may include therein a cooling arrangement such as that shown in FIGURE 7 as well as a brake adjusting means as set forth in FIGURES 12 through 14. Wherever it is desired or required suitable accessories such as grease seals, pressure seals, bearings, flexible hoses and braces can be utilized wherever needed. Also, check valves can be used in conjunction with the various fluid chambers or conduits if needed or required. The rings or discs may be lined with a suitable brake lining in order to further increase the braking action that takes place when the foot pedal is applied. The chamber 79 is adapted to have a quantity of oil or fluid therein of a suitable composition.

With further regards to the cooling arrangement shown in FIGURE 7, the centrifugal pump 89 is adapted to be made in the form of a disc plate and is adapted to have small lips, cups or depressions cut out or pressed upon the outer wall or surface of this plate, and this centrifugal pump is attached the same way as the brake lined disc 70 to the sleeve of the hub so that the pump will rotate with the hub, whereby this rotation in the fluid chamber sets up centrifugal force and forces fluid out through the passageway 92 in the outer wall plate of the brake drum assembly and on into the wrap-around coil shaped fluid cooling line 99. This coiled line is arranged in a wrapped around position with regard to the entire outer circumference of the drum assembly so as to permit the fluid as it circulates therethrough to become cooled before finally re-entering the fluid chamber through the return inlet opening provided and indicated by the numeral 95.

The present invention can be easily and conveniently installed on new or used vehicles or it can be removed from the same and readily serviced if desired or required.

The disc fluid control brake mechanism of the present invention can be used for automobiles, trucks, buses or the like and it is adapted to be made in a neat, compact unit and it can be readily attached directly to vehicles without requiring any substantial modification in the vehicle. The present invention embodies a multiple disc fluid controlled type brake mechanism that is actuated by and operated with a suitable fluid under pressure that comes from action of the vehicle master cylinder. The spindle 31 may be attached directly to the king pin and drag link assembly of a vehicle as one complete unit. If desired, a modification can be made by omitting the front wheel spindle up to a line at the inner side of the front wheel bearing 62 and discarding the king pin attachment of the same up to the inner wall of the member 37 to the outer wall of the same, with a circular opening cutout of the inner wall and the opening may be made of a sufficient size and may be provided with a pressure seal to permit the passage and insertion therethrough of the wheel spindle of the vehicle that the brakes are to be installed on, and this unit can be pushed through and connected and fastened with the front wheel bearings 62 and 63.

The system of the present invention is adapted to be used with one master cylinder connected to a foot brake pedal, so that when the foot brake pedal is pushed in, pressure will be applied to the front and rear wheel assemblies and wherein the pistons will press against the adjacent rings 72 and then the brake lined discs 70 will be engaged so that the holding action will take place. The coil springs 74 serve to release the rings and discs when the foot is removed from the brake pedal. The fluid in the chamber 79 functions to keep the parts cool and also this fluid prevents excessive wear on the parts. Each front wheel assembly can be used on the right or left side of the vehicle. The brakes of the present invention can be made at low cost and are constructed so that noise will be eliminated or minimized and also heat and squealing will be prevented, and since the brake linings work in fluid in the chamber 79, they will not have a tendency to get hot, crystalize, and fade out which heretofore has caused poor brakes. Also, the multiple disc fluid controlled brakes of the present invention are easy and simple to install and service.

For the purpose of exemplification a particular embodiment of the invention has been shown and described according to the best present understanding thereof however, it will be apparent to those skilled in the art, that many changes and modifications can be made therein without departing from the true spirit of the invention.

What is claimed is:

In a vehicle brake mechanism including inner and outer walls, a plurality of rotating discs disposed between said walls, a plurality of fixed rings each interfitted between adjacent ones of said discs, and an annular piston between said walls and movable toward and away from said rings and disc, said piston having a plurality of lugs arranged in spaced relation thereabout, said lugs being operable to press said rings and discs together responsive to movement of said piston toward said rings and discs, the one of said rings next adjacent said piston having a plurality of cams arranged with each cam engaging one of said lugs, teeth on the outer periphery of said one of said rings, a rotatable bolt supported in said inner wall, and gear teeth on said bolt meshingly engaged with said ring teeth and operable to rotate said one of said rings responsive to rotation of said bolt.

References Cited by the Examiner

UNITED STATES PATENTS

| | | | |
|---|---|---|---|
| 1,132,903 | 3/15 | Beck | 188—196MX |
| 2,105,867 | 1/38 | Stewart | 188—152AX |
| 2,486,144 | 10/49 | Frank | 188—72 |
| 2,531,696 | 11/50 | Martin | 188—72 |
| 2,664,176 | 12/53 | Whalen | 188—264 |
| 2,878,901 | 3/59 | Runner | 188—73 |
| 2,934,177 | 4/60 | Kelley et al. | 188—264 |
| 2,955,677 | 10/60 | Jones | 188—18A |
| 3,005,522 | 10/61 | Butler | 188—73 |
| 3,061,048 | 10/62 | Alsobrooks et al. | 188—18A |

ARTHUR L. LA POINT, *Primary Examiner.*
A. JOSEPH GOLDBERG, EUGENE G. BOTZ,
*Examiners.*